(12) United States Patent
Melkote et al.

(10) Patent No.: US 6,826,006 B1
(45) Date of Patent: Nov. 30, 2004

(54) METHOD FOR RECURSIVELY DETERMINING REPEATABLE RUNOUT CANCELLATION VALUES IN A MAGNETIC DISK DRIVE

(75) Inventors: Hemant Melkote, San Jose, CA (US); Russ A. Quisenberry, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 255 days.

(21) Appl. No.: 10/262,482

(22) Filed: Sep. 30, 2002

(51) Int. Cl.[7] .............................................. G11B 5/596
(52) U.S. Cl. .............................. 360/77.04; 360/77.01; 360/77.02
(58) Field of Search ........................ 360/75, 76, 77.01, 360/77.02, 77.04, 77.07–77.08

(56) References Cited

U.S. PATENT DOCUMENTS

| 6,141,175 A | 10/2000 | Nazarian et al. | |
| 6,563,663 B1 * | 5/2003 | Bi et al. | 360/77.04 |
| 6,574,067 B2 * | 6/2003 | Chen et al. | 360/77.04 |
| 2003/0058569 A1 * | 3/2003 | Hsin | 360/77.04 |

* cited by examiner

Primary Examiner—Sinh Tran
Assistant Examiner—Jason Olson
(74) Attorney, Agent, or Firm—Milad G. Shara, Esq.; Robroy R. Fawcett, Esq.

(57) ABSTRACT

A method is disclosed for recursively determining repeatable runout (RRO) cancellation values in a disk drive having a head disk assembly (HDA) and a sampled servo controller. The HDA includes a disk having distributed position information in servo wedges, a rotary actuator carrying a head that periodically reads the position information, and a voice coil motor circuit that responds to a control effort signal. The servo controller periodically adjusts the control effort signal during a track-following operation. In the method, resonant filter values for developing RRO cancellation values are iteratively learned and updated after each disk rotation during track following operations on a predetermined track until a threshold, such as a particular number of disk rotations, is obtained.

20 Claims, 5 Drawing Sheets

IDEAL SERVO TRACKS

METHOD FOR RECURSIVELY DETERMINING REPEATABLE RUNOUT CANCELLATION VALUES IN A MAGNETIC DISK DRIVE

BACKGROUND OF THE INVENTION

1. Field of the Invention

The present invention relates to rotating magnetic disk drives, and more particularly, to a method for determining repeatable runout written to a servo track during a servowriting process for accurate track following relative to a concentric track center.

2. Description of the Prior Art

Repeatable runout (RRO) in a disk drive results from imperfections, with respect to a perfect circle, in the location of servo information along a track on a disk surface in the disk drive. Due to disk spindle rotation, the servo imperfections due to RRO are periodic having a fundamental frequency that is equal to the spindle rotation frequency. The RRO imperfections are relatively static over time and the effect of the RRO may be attenuated by measuring the RRO during manufacturing and using the RRO measurements in a head-position servo loop to compensate for the RRO effect.

However, accurate RRO measurements may be difficult to obtain. The head-position servo loop may not be able to track the imperfections or may prevent convergence on cancellation values in a timely and cost effective manner.

Accordingly, there exists a need for technique for determining RRO cancellation values without unnecessarily increasing manufacturing costs or significantly decreasing manufacturing throughput. The present invention satisfies these needs.

SUMMARY OF THE INVENTION

The present invention may be embodied in a method, implemented in a magnetic disk drive, for recursively determining repeatable runout (RRO) cancellation values. The disk drive has a head disk assembly (HDA) and a sampled servo controller. The HDA includes a rotating magnetic disk having distributed position information in a plurality of uniformly spaced-apart servo wedges, and an actuator for positioning a transducer head in response to a control effort signal. The transducer head periodically reads the position information from the servo wedges. The sampled servo controller periodically adjusts the control effort signal during a track-following operation based on the position information. In the method, initial resonant filter states are stored, with each initial filter state corresponding to a servo wedge of a predetermined track. The stored resonant filter states are filtered to substantially compensate for effects of the sampled servo controller, which effects tend to distort position error signals generated during track following, to generate current repeatable runout cancellation values. A current repeatable runout cancellation value is generated for each servo wedge. The position information related to the predetermined track is read during track following for a disk rotation to generate position error signals based on the read position information and the current repeatable runout cancellation values. The position error signals are scaled to generate convergence values such that a convergence value is generated for each servo wedge. Each convergence value is applied to each corresponding stored resonant filter state to generate a resulting updated resonant filter state. The updated resonant filter states are stored to replace the previously stored resonant filter states. The above steps related to filtering, reading, scaling and applying are repeated until a predetermined threshold is obtained thus recursively determining the repeatable runout correction values.

In more detailed features of the invention, the predetermined threshold may be a particular number of disk rotations, such as 20. Alternatively, the predetermined threshold may be obtained when the position error signals are less than a particular level. Further, the position error signals generated during track following for the disk rotation may be based on a difference between the read position information and the current repeatable runout cancellation values. Each resulting updated resonant filter state may be generated by combining each convergence value with the corresponding previously stored resonant filter state.

In other more detailed features of the invention, each initial filter state may be set to zero, or may be set based on reading the position information related to the predetermined track during track following for an initial disk rotation. The step of filtering the stored resonant filter states to generate the current repeatable runout cancellation values may be performed using a filter based on an inverse error rejection function for compensating effects of the sampled servo controller. The inverse error rejection function may be modified with low frequency attenuation.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
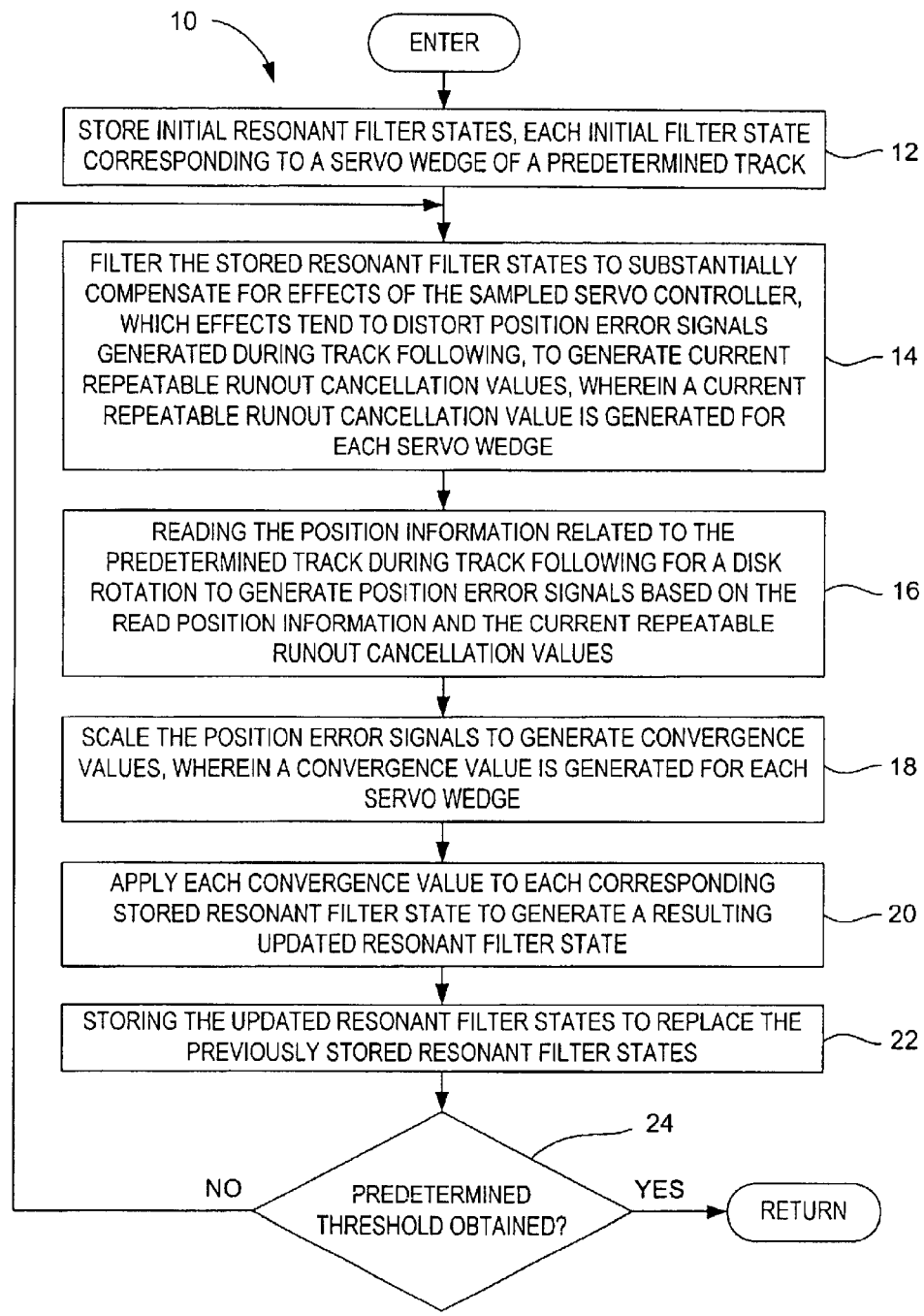
FIG. 1 is a flow chart illustrating an embodiment of a method for recursively determining repeatable runout (RRO) cancellation values in a magnetic disk drive, according to the present invention.
Figure 2:
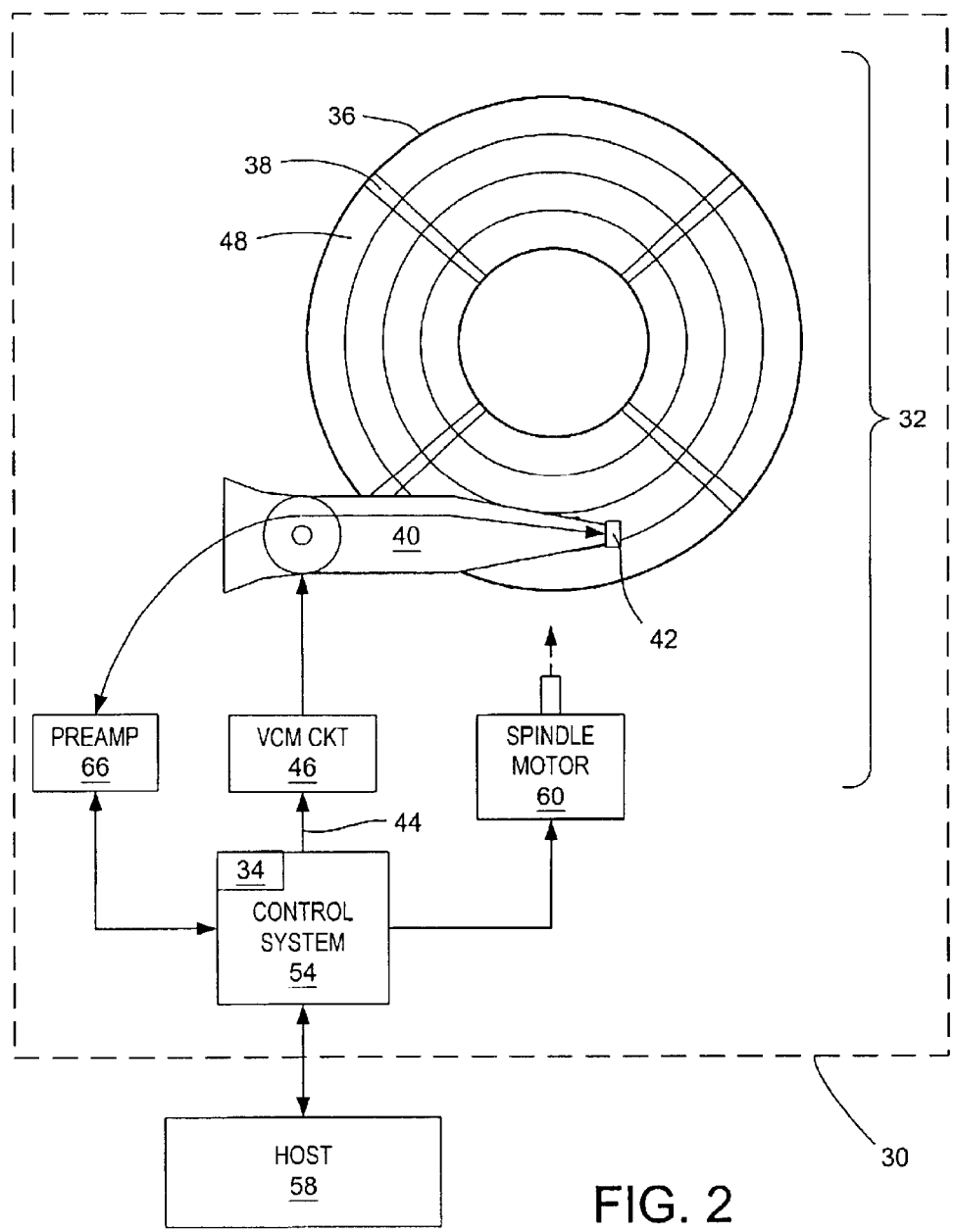
FIG. 2 is a block diagram of a computer system having a disk drive for implementing the recursively determining method of FIG. 1.
Figure 3:
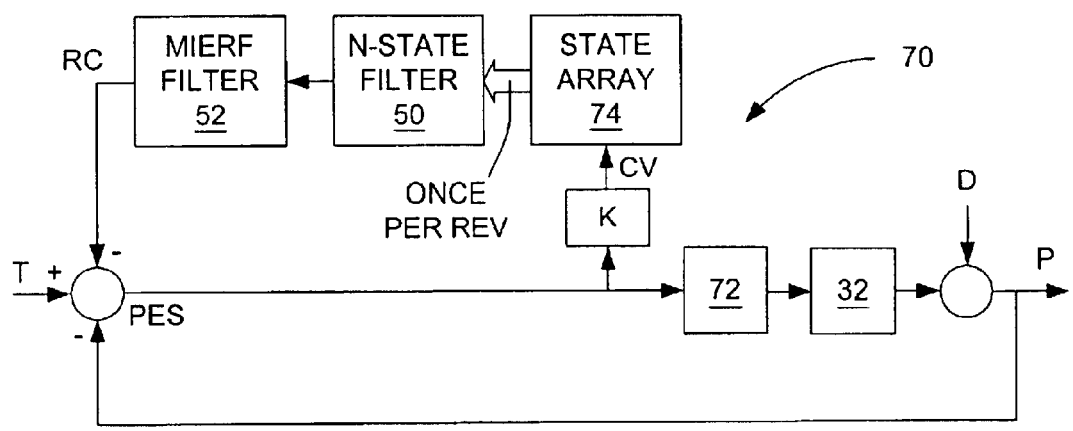
FIG. 3 is a block diagram of a servo control loop, within the disk drive of FIG. 2, for implementing the recursively determining method of FIG. 1.

With reference to FIGS. 1 through 3, the present invention may be embodied in a method 10 (FIG. 1), implemented in a magnetic disk drive 30 (FIG. 2), for recursively determining repeatable runout (RRO) cancellation values RC. The disk drive has a head disk assembly (HDA) 32 and a sampled servo controller 34. The HDA includes a rotating magnetic disk 36 having distributed position information in a plurality of uniformly spaced-apart servo wedges 38, and an actuator 40 that positions a transducer head 42 in response to a control effort signal 44 applied to a voice coil motor (VCM) circuit 46 that includes a voice coil motor coupled to the actuator. The transducer head periodically reads the position information from the servo wedges. The sampled servo controller periodically adjusts the control effort signal during a track-following operation based on the position information. In the method, initial resonant filter states of an Nth-order resonant filter 50 are stored, with each initial filter state corresponding to a servo wedge of a predetermined track 48 (step 12). The stored resonant filter states are filtered by a compensation filter 52 to substantially compensate for effects of the sampled servo controller, which effects tend to distort position error signals generated during track following, to generate current repeatable runout cancellation values RC (step 14). A current repeatable runout cancellation value is generated for each servo wedge. The position information P related to the predetermined track is read during track following for a disk rotation to generate position error signals (PES) based on the read position information and the current repeatable runout cancellation values (step 16). The position error signals are scaled to generate convergence values CV such that a convergence value is generated for each servo wedge (step 18). Each convergence value is applied to each corresponding stored resonant filter state to generate a resulting updated resonant filter state (step 20). The updated resonant filter states are stored to replace the previously stored resonant filter states (step 22). The above steps 14, 16, 18 20 and 22 are repeated until a predetermined threshold is obtained (step 24) thus recursively determining the RRO correction values RC.

The predetermined threshold may be a particular number of disk rotations. Empirical results have indicated that the PES resulting from RRO may be reduced by about 35% using RRO correction values recursively determined based on 20 disk rotations. Alternatively, the predetermined threshold may be obtained when the position error signals are less than a particular level as measured on, for example, a frequency spectrum of the signals.

Figure 5A:
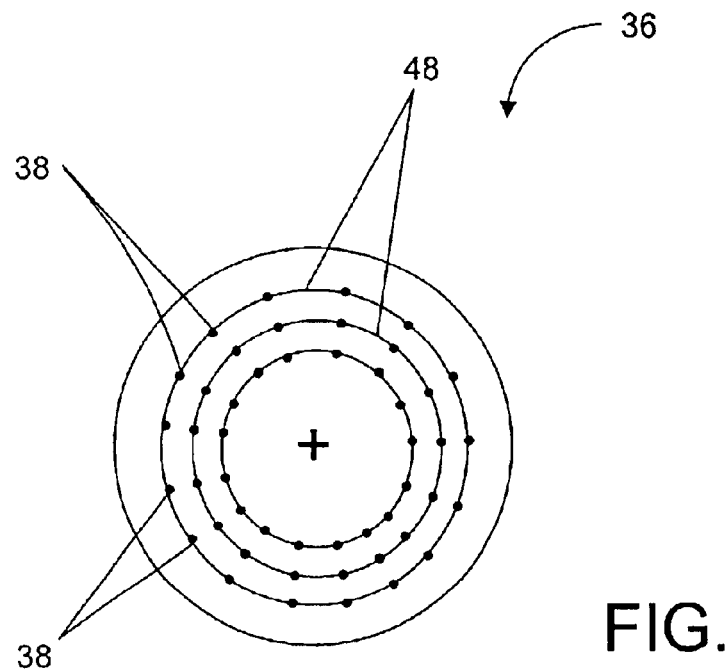
FIG. 5A is a schematic diagram illustrating ideal servo sector tracks on a disk of a disk drive.
Figure 5B:
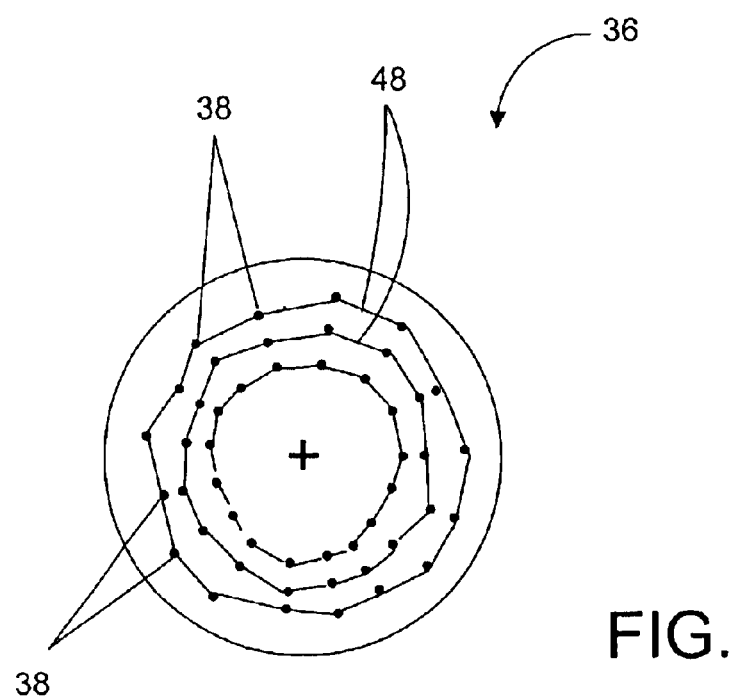
FIG. 5B is a schematic diagram illustrating written servo sector tracks exhibiting RRO.

An ideal track 48 is one that forms a perfect circle on the disk 36 as shown in FIG. 5A. During manufacture, servo information for the embedded servo sectors 38 is placed on the disk during a servo writing operation. The servo information includes servo bursts 38 that are placed at locations that deviate outwardly or inwardly from the ideal "center line" of the track circle as shown in FIG. 5B. These apparent deviations from the ideal track centerline can occur due to spindle runout, vibrations or movements during servo writing operation, and media defects or noise in the region of the servo bursts.

Cancellation of the wedge RRO, which may constitute nearly 50% of total PES variance, is desired to improve drive performance and achieve higher track densities. Details of particular properties, sources, and aspects of RRO in a magnetic disk drive 30, and techniques for canceling the RRO using the RRO correction values RC, are provided in U.S. patent application Ser. No. 09/652,857, filed Aug. 31, 2000, and U.S. Pat. No. 6,141,175, which are incorporated herein by reference.

The disk drive 30 (FIG. 2) includes a control system 54 and the HDA 32. The control system includes the sampled servo controller 34, and circuitry and processors that control the HDA and that provide an intelligent interface between a host 58 and the HDA for execution of read and write commands. The control system may have an internal microprocessor and nonvolatile memory for implementing the techniques of the invention. Program code for implementing the techniques of the invention may be stored in the non-volatile memory and transferred to volatile random access memory (RAM) for execution by the microprocessor. The HDA further includes a spindle motor 60, at least one disk 36, and a preamplifier 66.

Figure 4:
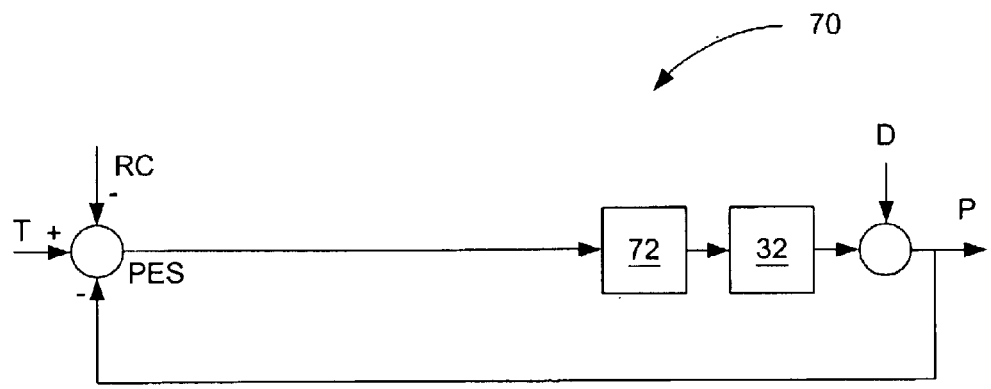
FIG. 4 is a block diagram of a servo control loop, within the disk drive of FIG. 2, for using the RRO values determined by the method of FIG. 1.

With reference to FIG. 3, a servo control loop for recursively determining the RRO cancellation values RC includes the HDA 32 after a track following compensator 72 implemented by the sampled servo controller 34. Disturbances D to the HDA alter the resulting head position P. The head position P is compared to a track selection signal T, and the RRO cancellation values are subtracted, to generate the PES. The RRO cancellation values estimate the RRO's effect on the reference. The track following compensator uses the PES to follow a track's centerline. For iteratively learning the RRO cancellation values, each PES sample is scaled, as indicated by block K, to generate a convergence value CV. The resulting convergence values generated during a disk revolution are held in a state array 74. Once per disk revolution, the convergence values held in the state array are applied to the stored resonance filter states. After the recursive process for iteratively learning the RRO cancellation values RC is performed for a particular track 48, the learned values may be written onto the disk 36 for reading during normal operation of the disk drive 30. After learning for all tracks is complete, the filters, 50 and 52, are no longer needed as shown in FIG. 4.

A state space realization of the N-state resonant filter 50, where N is the number of servo wedges 38 in the disk drive 30, may be given by the quadruple (A,B,C,D). Possible descriptions of the A and C matrices are given by $$A = \begin{bmatrix} 0 & 0 & \cdots & \lambda \\ 1 & 0 & \cdots & 0 \\ 0 & \ddots & 0 & 0 \\ 0 & \cdots & 1 & 0 \end{bmatrix} \quad (1)$$

$$C = [\,0 \;\; \cdots \;\; \lambda(1-\lambda)\,]$$

where $\lambda=0.9$ is a constant representing the filter gain. Then resonant filter's zero input response is given by $$x(k)=A^k x(0)$$

$$y(k)=CA^k x(0) \quad (2)$$

where $x(0)$ is the initial condition of the filter (a vector having a length equal to the number of servo wedges 38) on the j-th revolution of track following, and $y(k)$ is the filter output. The initial condition of the filter on the j-th revolution, defined by a state vector $x_1(0)$, is updated every spindle revolution according to the following:

$$x_{j+1}(0)=x_j(0)+Ke_1 \quad (3)$$

where $e_1$ is a vector (reorder to account for one wedge delay) of PES information given by $$e_l = \begin{bmatrix} PES(2) \\ \vdots \\ PES(N) \\ PES(1) \end{bmatrix} \quad (4)$$

with $PES(k)$, $k=1 \ldots N$, being the PES on the k-th servo wedge or sector. The matrix K is chosen to place the eigenvalues of $$I-\Gamma K \quad (5)$$

inside the unit circle, with I being the NXN identity matrix and $$\Gamma = \begin{bmatrix} CA \\ CA^2 \\ \vdots \\ CA^N \end{bmatrix}. \quad (6)$$

Placement of all the eigenvalues at 0.9 has been found to provide good performance, and is necessary and sufficient for the learning to converge. When all eigenvalues are placed at the same location, the K matrix turns out to have the following form:

$$K = \begin{bmatrix} 0 & \cdots & k_1 & 0 \\ \vdots & \cdot{}^{\cdot} & \cdot{}^{\cdot} & \vdots \\ k_1 & 0 & \cdots & 0 \\ 0 & 0 & \cdots & k_2 \end{bmatrix} \quad (7)$$

with $k_1$ and $k_2$ being constants. Therefore, substituting equation 7 into equation 3 provides $$x_{l+1}(0) = \quad (8)$$

$$x_l(0) + \begin{bmatrix} 0 & \cdots & k_1 & 0 \\ \vdots & \cdot{}^{\cdot} & \cdot{}^{\cdot} & \vdots \\ k_1 & 0 & \cdots & 0 \\ 0 & 0 & \cdots & k_2 \end{bmatrix} \begin{bmatrix} PES(2) \\ \vdots \\ PES(N) \\ PES(1) \end{bmatrix} = x_j(0) + \begin{bmatrix} k_1 \times PES(N) \\ \vdots \\ \vdots \\ k_2 \times PES(1) \end{bmatrix}$$

Hence, starting with the N'th order filter states initially zeroed out (i.e., $x_1(0)=0$ on an initial revolution of track following), the state vector is recursively updated using equation 8. Once learning is complete, the values may be saved into an array or written onto the disk surface.

Figure 6:
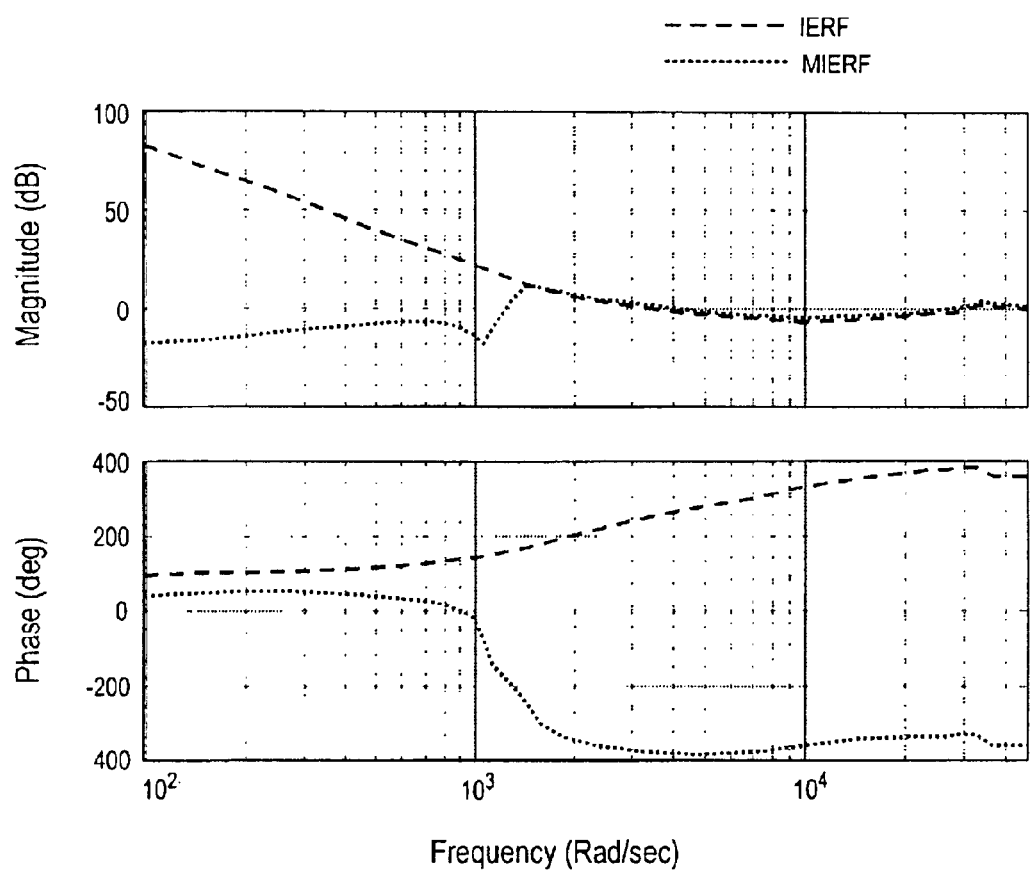
FIG. 6 is a graph showing a bode plot of magnitude and phase versus frequency for an inverse error rejection function, and a modified inverse error rejection function, for the servo control loop of FIG. 3.

A bode plot of a representative inverse error rejection function (IERF), and a modified inverse error rejection function (MIERF), is shown in FIG. 6. The inverse error rejection function compensates for the effects of the servo controller on the position values P. The compensation filter 52 advantageously implements a stable version of the frequency response of the modified inverse error rejection function, which has attenuation in the low frequency range. An objective of the compensation filter is to reconstruct the high frequency portion of the raw RRO source, and the filter may be designed in MATLAB using a suitable filter design tool.

We claim:

1. In a magnetic disk drive having a head disk assembly (HDA) and a sampled servo controller, the HDA including a rotating magnetic disk having distributed position information in a plurality of uniformly spaced-apart servo wedges, and an actuator for positioning a transducer head in response to a control effort signal, the transducer head for periodically reading the position information from the servo wedges, the sampled servo controller for periodically adjusting the control effort signal during a track-following operation based on the position information, a method for recursively determining repeatable runout cancellation values comprising the steps of:

a) storing initial resonant filter states, each initial filter state corresponding to a servo wedge of a predetermined track;

b) filtering the stored resonant filter states to substantially compensate for effects of the sampled servo controller, which effects tend to distort position error signals generated during track following, to generate current repeatable runout cancellation values, wherein a current repeatable runout cancellation value is generated for each servo wedge;

c) reading the position information related to the predetermined track during track following for a disk rotation to generate position error signals based on the read position information and the current repeatable runout cancellation values;

d) scaling the position error signals to generate convergence values, wherein a convergence value is generated for each servo wedge;

e) applying each convergence value to each corresponding stored resonant filter state to generate a resulting updated resonant filter state;

f) storing the updated resonant filter states to replace the previously stored resonant filter states; and g) repeating steps b), c), d), e) and f) until a predetermined threshold is obtained thus recursively determining the repeatable runout correction values.

2. A method for recursively determining repeatable runout cancellation values as defined in claim 1, wherein the predetermined threshold is a particular number of disk rotations.

3. A method for recursively determining repeatable runout cancellation values as defined in claim 2, wherein the particular number of disk rotations is 20.

4. A method for recursively determining repeatable runout cancellation values as defined in claim 1, wherein the predetermined threshold is obtained when the position error signals are less than a particular level.

5. A method for recursively determining repeatable runout cancellation values as defined in claim 1, wherein the position error signals generated during track following for the disk rotation in step c) is based on a difference between the read position information and the current repeatable runout cancellation values.

6. A method for recursively determining repeatable runout cancellation values as defined in claim 1, wherein each resulting updated resonant filter state is generated by combining each convergence value with the corresponding previously stored resonant filter state.

7. A method for recursively determining repeatable runout cancellation values as defined in claim 1, wherein each initial filter state is zero.

8. A method for recursively determining repeatable runout cancellation values as defined in claim 1, wherein the initial filter states are based on reading the position information related to the predetermined track during track following for an initial disk rotation.

9. A method for recursively determining repeatable runout cancellation values as defined in claim 1, wherein filtering the stored resonant filter states to generate the current repeatable runout cancellation values is performed using a filter based on an inverse error rejection function for compensating effects of the sampled servo controller.

10. A method for recursively determining repeatable runout cancellation values as defined in claim 1, wherein filtering the stored resonant filter states to generate the current repeatable runout cancellation values is performed using a filter based on an inverse error rejection function, with low frequency attenuation, for compensating effects of the sampled servo controller.

11. A magnetic disk drive that recursively determines repeatable runout cancellation values, comprising:

a head disk assembly (HDA) including
  a rotating magnetic disk having distributed position information in a plurality of uniformly spaced-apart servo wedges, and
  an actuator for positioning a transducer head in response to a control effort signal,
  the transducer head periodically reading the position information from the servo wedges;
a sampled servo controller for periodically adjusting the control effort signal during a track-following operation based on the position information;
means for storing initial resonant filter states, each initial resonant filter state corresponding to a servo wedge of a predetermined track;
means for filtering the stored resonant filter states to substantially compensate for effects of the sampled servo controller, which effects tend to distort positional error signals generated during track following, to generate current repeatable runout cancellation values, wherein a current repeatable runout cancellation value is generated for each servo wedge;
means for reading the position information related to the predetermined track during track following for a disk rotation to generate position error signals based on the read position information and the current repeatable runout cancellation values;
means for scaling the position error signals to generate convergence values, wherein a convergence value is generated for each servo wedge;
means for applying each convergence value to each corresponding stored resonant filter state to generate a resulting updated resonant filter state;
means for storing the updated resonant filter states to replace the previously stored resonant filter states; and
means for recursively updating the resonant filter states until a predetermined threshold is obtained for determining the repeatable runout cancellation values.

12. A disk drive that recursively determines repeatable runout cancellation values as defined in claim 11, wherein the predetermined threshold is a particular number of disk rotations.

13. A disk drive that recursively determines repeatable runout cancellation values as defined in claim 12, wherein the particular number of disk rotations is 20.

14. A disk drive that recursively determines repeatable runout cancellation values as defined in claim 11, wherein the predetermined threshold is obtained when the position error signals are less than a particular level.

15. A disk drive that recursively determines repeatable runout cancellation values as defined in claim 11, wherein the position error signals generated by the means for reading during track following are based on a difference between the read position information and the current repeatable runout cancellation values.

16. A disk drive that recursively determines repeatable runout cancellation values as defined in claim 11, wherein each resulting updated resonant filter state is generated by combining each convergence value with the corresponding previously stored resonant filter state.

17. A disk drive that recursively determines repeatable runout cancellation values as defined in claim 11, wherein each initial filter state is zero.

18. A disk drive that recursively determines repeatable runout cancellation values as defined in claim 11, wherein the initial filter states are based on reading the position information related to the predetermined track during track following for an initial disk rotation.

19. A disk drive that recursively determines repeatable runout cancellation values as defined in claim 11, wherein the means for filtering the stored resonant filter states comprises a filter based on an inverse error rejection function for compensating effects of the sampled servo controller.

20. A disk drive that recursively determines repeatable runout cancellation values as defined in claim 11, wherein means for filtering the stored resonant filter states comprises a filter based on an inverse error rejection function, with low frequency attenuation, for compensating effects of the sampled servo controller.

* * * * *